United States Patent
Douriet (10) Patent No.: US 7,275,222 B2
(45) Date of Patent: Sep. 25, 2007

(54) METHOD, APPARATUS, AND COMPUTER PROGRAM PRODUCT FOR ENHANCING A POWER DISTRIBUTION SYSTEM IN A CERAMIC INTEGRATED CIRCUIT PACKAGE

(75) Inventor: Daniel Douriet, Round Rock, TX (US)

(73) Assignee: International Business Machines Coproation, Armonk, NY (US)

( * ) Notice: Subject to any disclaimer, the term of this patent is extended or adjusted under 35 U.S.C. 154(b) by 406 days.

(21) Appl. No.: 11/002,686

(22) Filed: Dec. 2, 2004

(65) Prior Publication Data

US 2006/0123374 A1 Jun. 8, 2006

(51) Int. Cl.
*G06F 17/50* (2006.01)

(52) U.S. Cl. .................. 716/1; 716/7; 716/8; 716/9; 716/10

(58) Field of Classification Search ............ 716/1, 716/7–13
See application file for complete search history.

(56) References Cited

U.S. PATENT DOCUMENTS

| | | | |
|---|---|---|---|
| 4,811,237 A * | 3/1989 | Putatunda et al. ............ 716/9 |
| 6,880,143 B1 * | 4/2005 | Yu ................................. 716/8 |
| 6,920,403 B2 * | 7/2005 | Ootouge ........................ 716/1 |
| 7,155,684 B2 * | 12/2006 | Kusumoto ..................... 716/1 |
| 2006/0095870 A1 * | 5/2006 | Tai et al. ........................ 716/1 |

* cited by examiner

*Primary Examiner*—Paul Dinh
(74) *Attorney, Agent, or Firm*—Duke W. Yee; Diana R. Gerhardt; Lisa L. B. Yociss (57) ABSTRACT

A method, apparatus, and computer program product are disclosed for automatically enhancing a power distribution system (PDS) in a ceramic integrated circuit package. The package includes multiple layers. The entire package is divided into a three-dimensional grid that includes multiple different grid cells. Information is associated with each one of the cells. For each one of the cells, the information included in the cell describes characteristics of the physical location of that cell relative to the other cells in the three-dimensional package. The information also describes any via or trace that already passes through said that cell. Potential new via and/or trace locations are automatically located throughout all of the entire package utilizing the information.

16 Claims, 9 Drawing Sheets

METHOD, APPARATUS, AND COMPUTER PROGRAM PRODUCT FOR ENHANCING A POWER DISTRIBUTION SYSTEM IN A CERAMIC INTEGRATED CIRCUIT PACKAGE

BACKGROUND OF THE INVENTION

1. Technical Field

The present invention is directed to data processing systems. More specifically, the present invention is directed to a method, apparatus, and computer program product for automatically enhancing a power distribution system (PDS) in a ceramic integrated circuit package.

2. Description of Related Art

Current trends in VLSI applications are pushing the requirements for current in an integrated circuit (IC), also called a chip, to be in the range of 200 amps and above under normal conditions and may be even higher IC's operating voltages are driven to values as low as 1 volt or less. A package to which the chip is coupled has a power distribution system (PDS) that is responsible for distributing power throughout the package and to the IC. A power distribution system includes all power nets such as all supply voltage nets as well as a ground net. The PDS has to be able to deliver such high current densities to the IC while at the same time having minimum impedance in order to keep any voltage losses at very low values throughout the many layers of the package.

Until recently, the PDS of first level packages has been more than adequate to meet the current and voltage requirements of high performance ICs. First level packages are interconnect devices that hold bare silicon chips and provide connectivity, power delivery, and heat removal between them and the rest of the larger electrical system. As new silicon technologies require more stringent power demands, the contributing ohmic resistive losses of the first level packaging portion start becoming more significant and need to be carefully designed and analyzed in order to ensure its adequacy.

The design of the PDS is particularly difficult in high signal density ceramic packages where the conductor materials are based in relatively lossy metal pastes which aggravate the ohmic resistive losses and where the routing of signal traces is so congested tending to limit the available real estate left for reinforcing the power distribution system. This is more problematic in the portions of the package that lie directly underneath the chip where most of the current density needs to flow and where the breakout wiring of signals consumes a large portion of the available space. In addition, the overall current flow takes place in the vertical direction from the bottom pins of the package to the top connections of the IC itself, thus causing the via interconnects to play a more predominant role than the horizontal solid or mesh plane connections.

When an engineering analysis determines that a package's power distribution system needs to be reinforced or enhanced, the task of finding opportunities in the design of the package where vias and traces can be added becomes very time consuming and labor intensive. The designer has to take into account the three-dimensional nature of the problem because the package includes many layers. Further, the number of via and/or elements that may be required to be added can be in the order of thousands.

The features provided by prior art systems do not offer the ability to locate possible additional via and/or trace locations in an automatic or large scale manner considering the entire package as a whole. Thus, this process of locating possible via and/or trace locations is a time consuming manual process.

Therefore, a need exists for a method, system, and computer program product for automatically enhancing a power distribution system (PDS) in a ceramic package by locating possible additional trace and/or via locations throughout the package considering the package as a whole.

SUMMARY OF THE INVENTION

A method, apparatus, and computer program product are disclosed for automatically enhancing a power distribution system (PDS) in a ceramic integrated circuit package. The package includes multiple layers. The entire package is divided into a three-dimensional grid that includes multiple different grid cells. Information is associated with each one of the cells. For each one of the cells, the information included in the cell describes characteristics of the physical location of that cell relative to the other cells in the three-dimensional package. The information also describes any via or trace that already passes through said that cell. Potential new via and/or trace locations are automatically located throughout all of the entire package utilizing the information.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product for automatically enhancing a power distribution system (PDS) in a multilayered ceramic integrated circuit package that is coupled to an integrated circuit, also called a chip. The power distribution system in the package is built and/or enhanced for providing power to the chip that is attached to the package. The present invention provides for reinforcing the power distribution system by identifying physical locations within the entire module where vias and/or traces can be added automatically.

The layout of data signals in the existing package design has already been completed. The data signals may be partially or fully wired. The existing package design may already include some vias and/or traces that are used to deliver power to the chip to which the package will be coupled. Some of these vias may be buried within the design. The present invention automatically identifies locations within the existing package design where new vias may be added and where traces can be added or extended by considering the package design as a whole.

For ceramic packages, the bulk of the current flow is in the vertical dimension. Therefore, it is necessary to assign a higher priority to the addition of vias. As vias have a larger cross-section than traces, it is desirable to emphasize the addition of long via connections, thus minimizing the reliance on current conduction through the plane of a layer through the resistive traces. Also, the restricted conductivity in the plane of a layer forces most of the current to closely follow the current sources and drains. Thus, the current density in the package will be concentrated under the chip's location where the chip is coupled to the package.

The present invention can limit the areas where vias are added to those areas where the current density is the largest. These areas can be readily determined by using circuit simulation tools. These areas can also be estimated by considering the outline of the active components in the chip. A particular amount for the current density could be specified. The potential locations where vias/traces can be added can be limited to areas that have current densities that exceed the particular amount.

Potential via locations are found by first finding the locations where the longest vias can be added. Vias locations are found that will first connect the top-most layer to the bottom-most layer. Vias locations are next found that connect the remaining intermediate layers, adding the longest vias first. Traces are then built up in all layers by finding locations where traces can be extended. Locations are then found for multiple vias which will connect the package's bottom pins to the power structure.

The modifications to the power distribution system in the package are under the control of the user through the use of the constraints. The modifications to the power distribution system do not result in any changes to the existing data signal wiring. Potential locations are found throughout the entire package such that a large number of modifications can be made at one time. Thus, all potential locations for additional vias and enhanced traces are presented at one time to the user. After these potential locations are found, the user has a means to assess the modified PDS and to control these modifications through the use of a graphical user interface (GUI).

Several considerations must be taken into account when selecting locations in a package for adding and/or extending power signals. These considerations are implemented through constraints. For example, power signals need to be added to the package in order to provide power to the chip and to shield data signals that have already been laid out in the package. In addition, the final package design must be capable of being manufactured.

Constraints are specified that are used when locating potential via and/or trace locations. These constraints are a set of engineering design rules that are specified by a user. The constraints may specify manufacturing constraints, wireability constraints, and power delivery system constraints. For example, manufacturing constraints can include limits on the depth of new vias requiring that they are at least a particular number of layers deep since it is difficult to manufacture vias that are shorted than a particular depth.

An example of a wireability constraint is to require that new vias/traces do not prevent the integrated circuit's (chip's) data signals from being wired to their intended destinations within the package. Power delivery system constraints may specify that vias/traces contribute to the achievement of the desired engineering goals of delivering voltage and current to the different devices within the integrated circuit.

Other constraints specify that data signal traces be shielded by power traces. A ceramic package includes a power distribution system of mesh power planes instead of solid power planes. In these packages, the signal traces that are already included in the package design need to be shielded by power traces. Thus, once a layout of all data signals has been completed, the layout of the power distribution system is completed by making sure that all data signals are shielded by power signals. Thus, power traces need to be routed in the layout of the power nets in the package such that power signals run above and beneath the data signals.

The present invention can be used to locate potential via and/or trace locations by finding locations that satisfy these constraints. The constraints can include limiting the area where vias can be added to the areas where the current density is the largest. These areas can be readily determined by using circuit simulation tools. The constraints can also specify adding as many vias as needed by first attempting to find potential via locations that would connect the top-most layer to the bottom-most layer. Thereafter, the constraints can specify that via locations be found that are between the remaining intermediate layers, finding the longest possible potential via locations first. Another constraint can define extending traces in each layer. Another constraint can define using multiple vias to connect the module bottom pins to the power distribution system. The definitions of the constraints are made by a user.

The present invention is a method, apparatus, and product for finding potential via and/or trace locations given a set of pre-defined constraints. The user can define the constraints that will control the number, type, and location of the vias/traces being added or modified.

The present invention is implemented by first receiving a three-dimensional package geometry structure. This structure is generated using prior art methods. The geometry includes the location of all data signal in all layers of the package.

Next, according to the present invention, the package geometric elements are broken down into discrete units, determined by the grid dimensions, and loaded into a tri-dimensional matrix. This matrix can be traversed in any number of directions in order to perform the different functions needed to evaluate and improve the power distribution system.

In addition, once the potential locations for vias/traces are located, the present invention updates the power distribution system by adding and modifying vias/traces. By interactively controlling the quantity, location, and type of modifications to the power distribution system, and by performing the modifications to the entire power distribution system in an entire module at one time, the user can complete the task of reinforcing the power distribution system in a much shorter time as compared with prior art methods.

Figure 1:
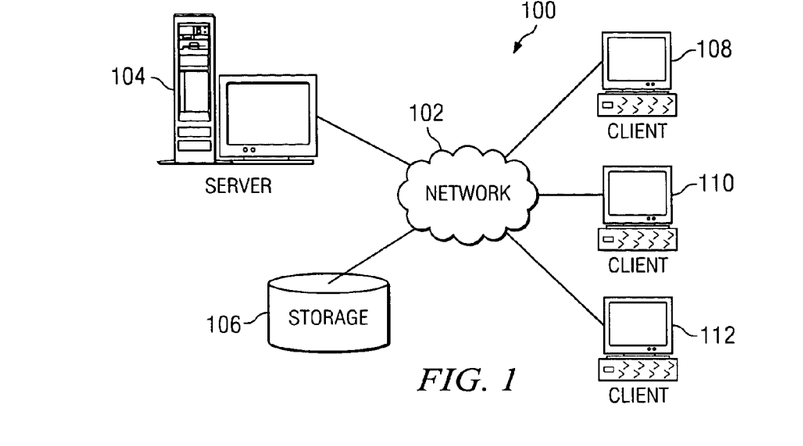
FIG. 1 is a pictorial representation of a network of data processing systems in accordance with the present invention.

FIG. 1 is a pictorial representation of a network 100 of data processing systems in which the present invention may be implemented. Data processing system network includes a network 102 which is the medium used to provide communications links between various devices and computers connected together within data processing system network 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Data processing system network 100 may include additional servers, clients, and other devices not shown. In the depicted example, data processing system network 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

Figure 2:
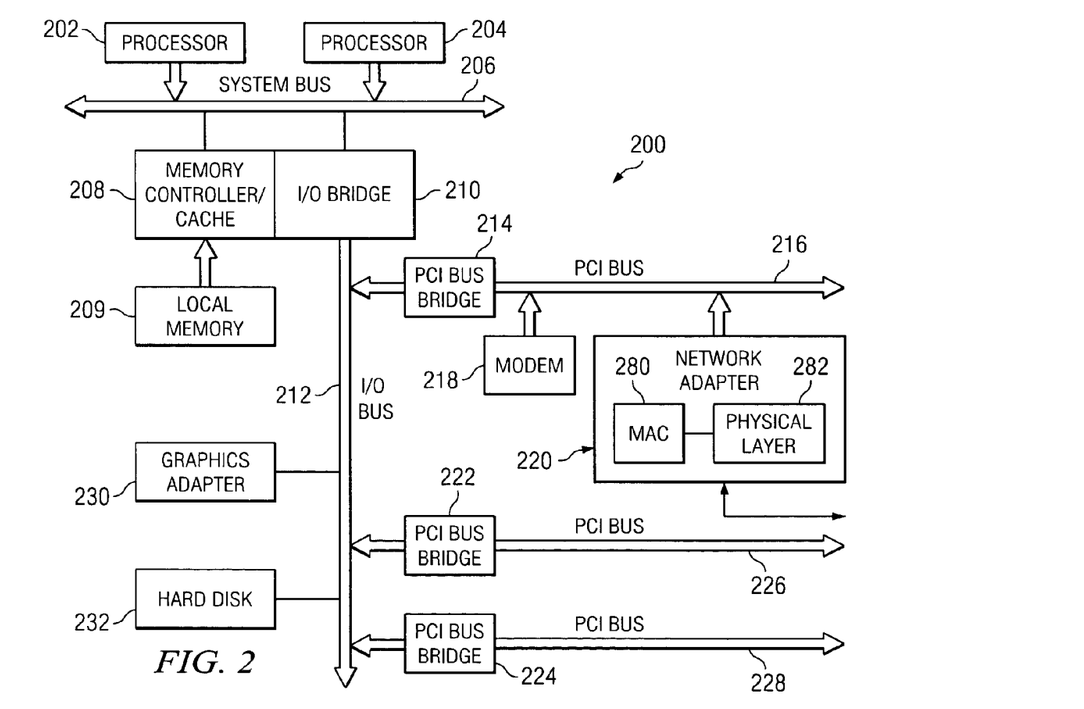
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

Figure 3A:
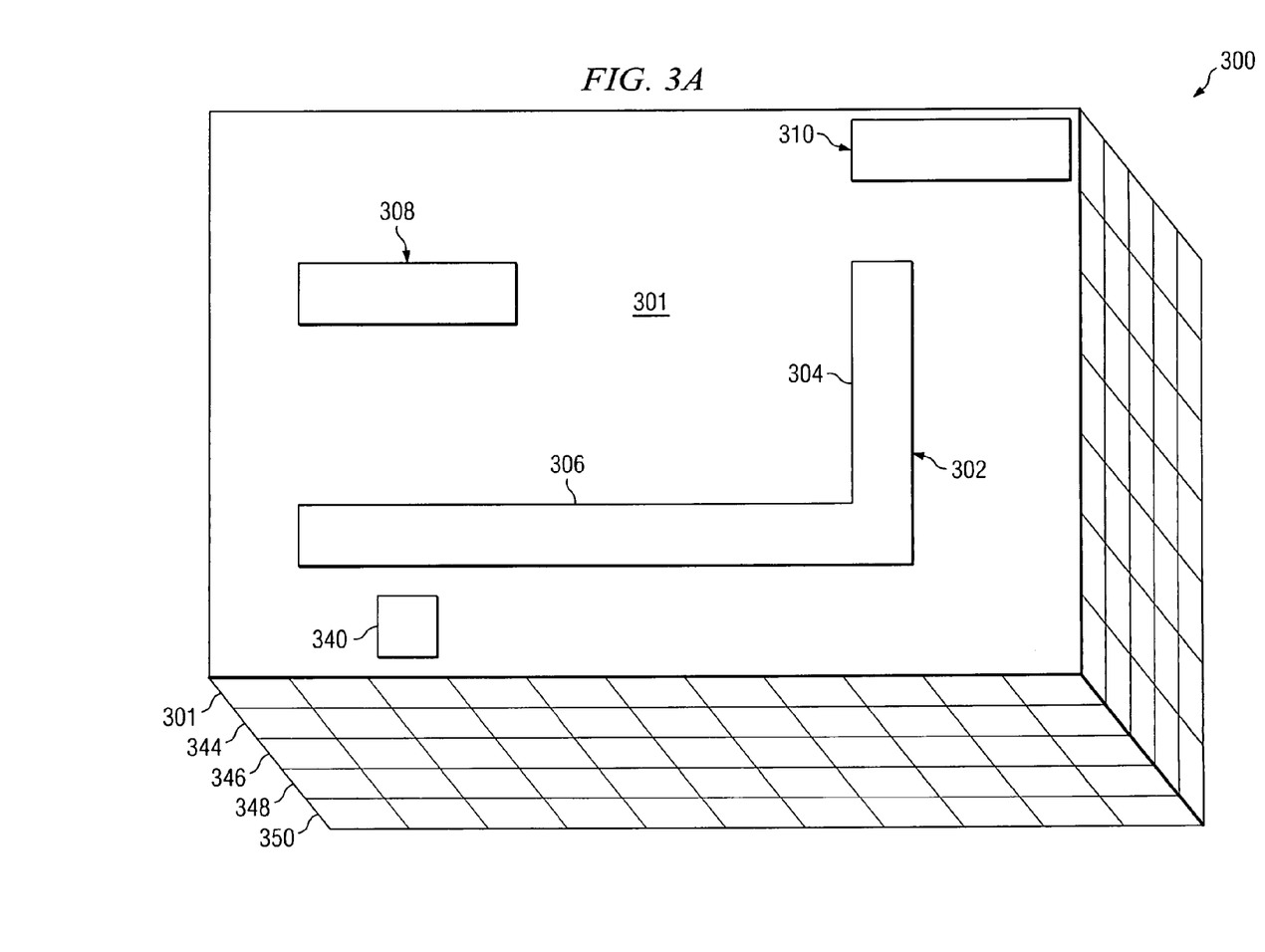
FIG. 3A is a top view of a ceramic package that includes a layer where the layer includes traces and a via in accordance with the present invention.

FIG. 3A is a top view of a ceramic package design 300 that includes a layer 301 where layer 301 includes traces 302, 308, and 310 and a via 340 in accordance with the present invention. Trace 302 includes a vertical leg 304 and a horizontal leg 306. A buried via 342 (see FIG. 3D) is also included in design 300. The present invention may be used to locate possible additional via and/or trace locations in layer 301.

Figure 3B:
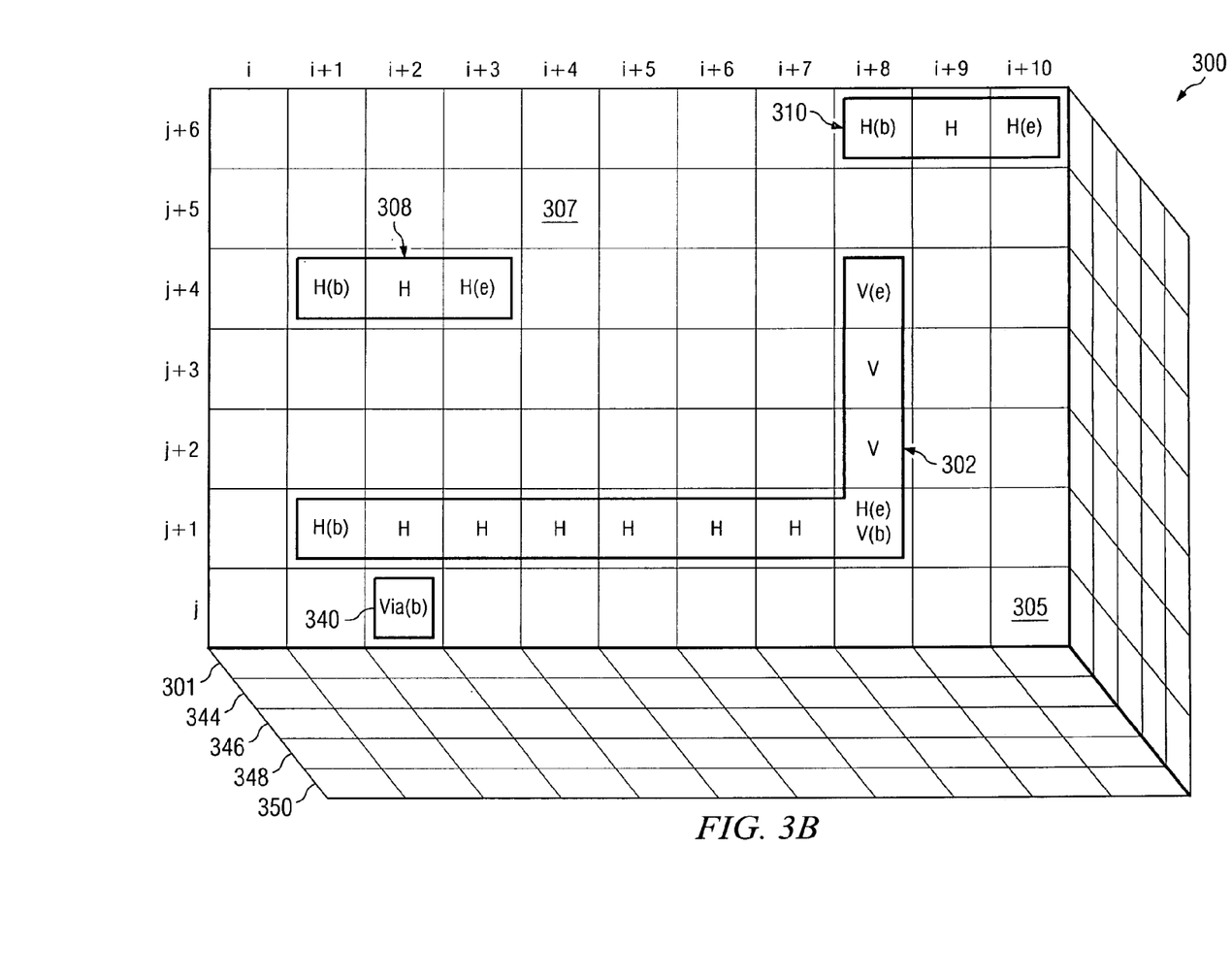
FIG. 3B is a top view of the layer of FIG. 3A after the package design has been divided into a plurality of three-dimensional grid blocks in accordance with the present invention.

FIG. 3B is a top view of layer 301 of FIG. 3A after package design 300 has been divided into a plurality of three-dimensional grid blocks or cells, such as cells 305 and 307, in accordance with the present invention. Layer 301 has been divided into 77 cells. Each cell location is identified by an i, j, and k location. Since this is the top layer, the k value for each one of the 77 cells is equal to 1. For example, cell 305 is identified as being cell location i=11, j=1, and k=1. Cell 307 is identified as being cell location i=5, j=6, and k=1.

The cells are uniformly shaped. Information is stored in each cell location. For example, if a via or trace is present in the cell, that information is stored in the cell. The information includes an identification of which power net the pre-existing via or trace is part of. Information indicating whether a trace that passes through a cell either starts or ends in that cell is included in the information. If the cell includes an existing via, information will be stored in the cell to indicate whether the via in the cell is the beginning or ending location of the via. In addition, each cell's physical location, indicated by the i,j,k coordinates, is also stored within the cell.

For example, because horizontal leg 306 of trace 302 starts at cell location i=2 and j=2, information [H(b)] is stored in this cell location indicating that the trace in the cell is the beginning of a horizontal trace. Information is stored in cells i=3,j=2 through i=8,j=2 that these cells include the horizontal leg of trace 302. Cell location i=9,j=2 includes information indicating that this cell location includes the end of the horizontal leg of trace 302 and the beginning of the vertical leg of trace 302. Cell locations i=9,j=3 and i=9,j=4 include information indicating that these cell locations include the vertical leg of trace 302. Information is stored in cell location i=9,j=5 indicating the this cell includes the end of the vertical leg of trace 302. In addition, in each one of these cell locations i=2,j=2 through i=9,j=2 and i=9,j=2 through i=9,j=5, information is stored that indicates which power net trace 302 is part of. For example, if trace 302 is a ground trace, that information is stored in each one of these cell locations i=2,j=2 through i=9,j=2 and i=9,j=2 through i=9,j=5. Alternatively, if trace 302 is a particular supply voltage net, that information is stored in these cell locations.

Cell location i2,j5 includes information that indicates that this location includes the beginning of horizontal trace 308, as well as information that indicates which power net trace 308 is connected to, and other information as described above. Cell location i3,j5 includes information that indicates that the location includes part of horizontal trace 308 as well as other information described above. Cell location i4,j5 includes information that indicates that this location includes the end of horizontal trace 308 as well as other information as described above.

Cell location i9,j7 includes information that indicates that this location includes the beginning of horizontal trace 310, as well as information that indicates which power net trace 310 is connected to, and other information as described above. Cell location i10,j7 includes information that indicates that the location includes part of horizontal trace 310 as well as other information described above. Cell location i11,j7 includes information that indicates that this location includes the end of horizontal trace 310 as well as other information as described above.

Cell location i3,j1 includes information that indicates that this location includes the beginning of via 340.

Figure 3C:
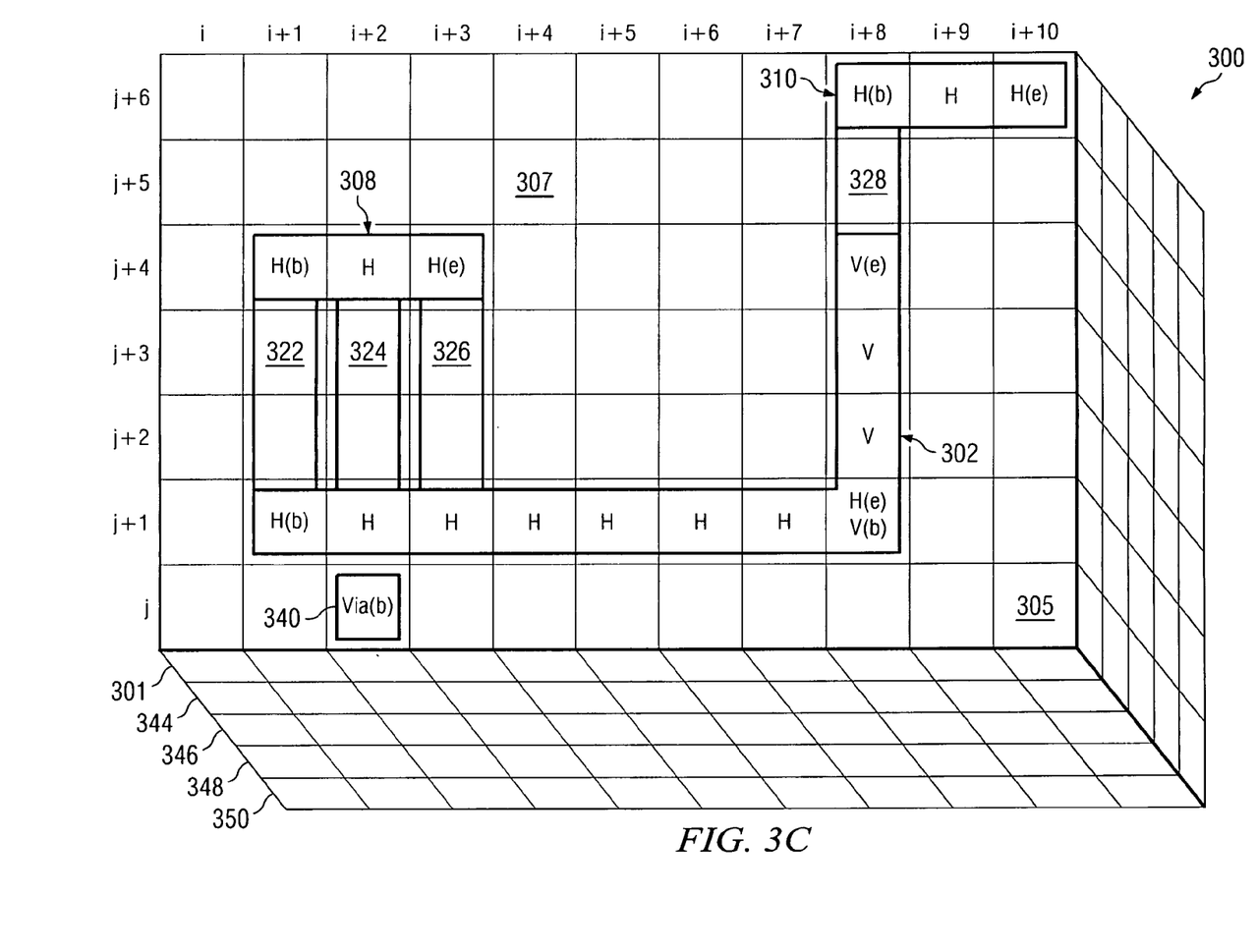
FIG. 3C is a top view of the layer of FIG. 3A after the package design has been divided into a plurality of three-dimensional grid blocks and after traces have been extended in the layer in accordance with the present invention.

FIG. 3C depicts a block diagram top view of the layer 300 of FIG. 3A that has been divided into a plurality of grid blocks and includes trace extensions in accordance with the present invention.

Traces 302 and 308 have been extended in accordance with the present invention. A determination has been made that all three traces are part of the same power net. For example, all three traces may be part of a particular supply voltage net. Each cell location in the entire grid is analyzed from cell location i=1,j=1 through i=11,j=9. This process is described in greater detail with reference to FIGS. 6 and 7.

A trace 322 has been added from cell location i=2,j=2 to cell location i=2,j=5. A trace 324 has been added from cell location i=3,j=2 to cell location i=3,j=5. A trace 326 has been added from cell location i=4,j=2 to cell location i=4,j=5. And, a trace 328 has been added from cell location i=9,j=5 to cell location i=9,j=7.

Figure 3D:
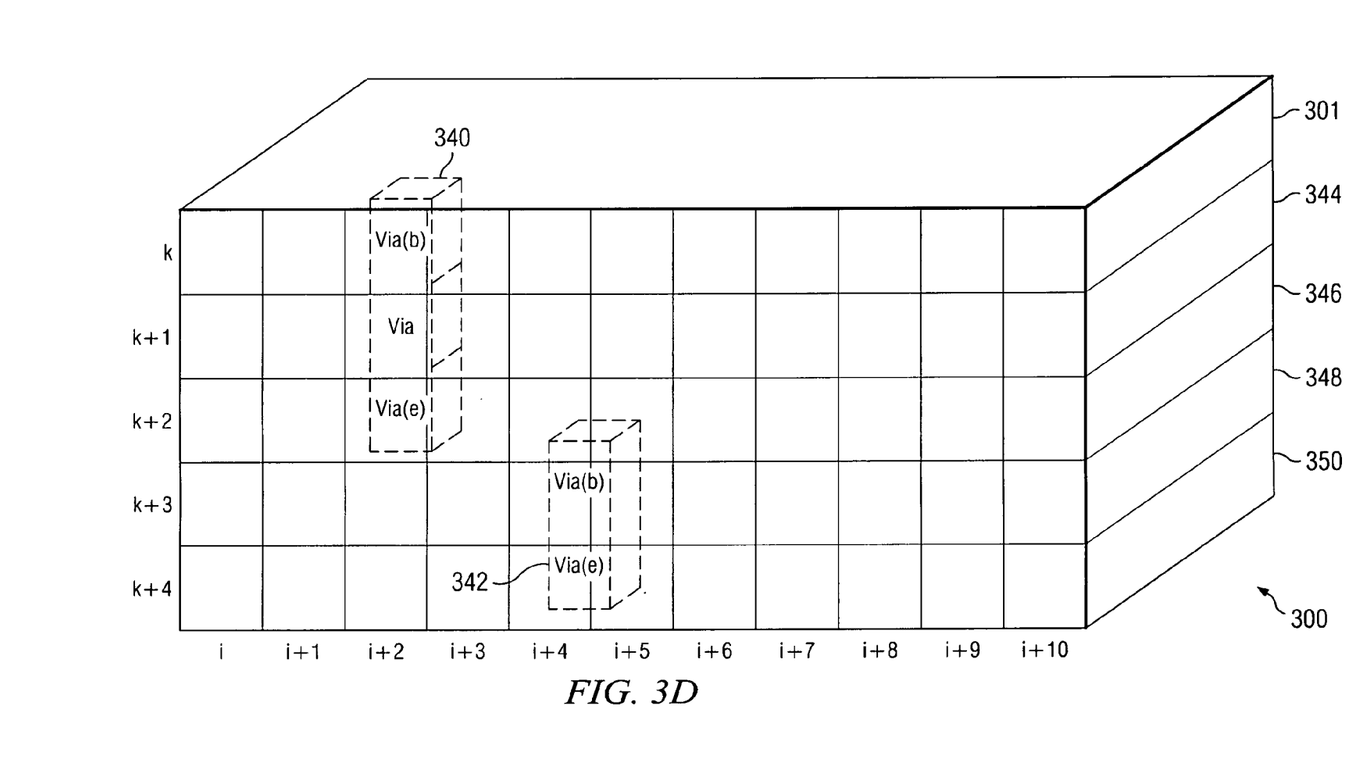
FIG. 3D is a side view of the ceramic package of FIG. 3A after the package design has been divided into a plurality of three-dimensional grid blocks in accordance with the present invention.

FIG. 3D is a side view of the ceramic package of FIG. 3A after the package design 300 has been divided into a plurality of three-dimensional grid blocks in accordance with the present invention. Package design 300 includes a plurality of layers such as layers 301, 344, 346, 348, and 350. Layer 301 is a top-most layer. Layer 350 is a bottom-most layer. Layers 344-348 are intermediate layers.

Cell location i3,j1,k1 includes information that indicates that this location includes the beginning of via 340. The index k1 indicates that this location is in layer 301. Cell location i3,j1,k2 includes information that indicates that this location includes part of via 340. The index k2 indicates that this location is in layer 344. Cell location i3,j1,k3 includes information that indicates that this location includes the end of via 340. The index k3 indicates that this location is in layer 346.

Cell location i5,j1,k4 includes information that indicates that this location includes the beginning of via 342. The index k4 indicates that this location is in layer 348. Cell location i5,j1,k5 includes information that indicates that this location the end of via 342. The index k5 indicates that this location is in layer 350.

Locations for new vias can be found according to the present invention. For example, a new via location may be found from i2,j1,k1 through i2,j1,k5 if the constraints are satisfied. However, a new via location from cell location i5,j1,k1 through i5,j1,k3 possibly may not be added because existing via 342 limits the length of the potential new via.

Figure 4:
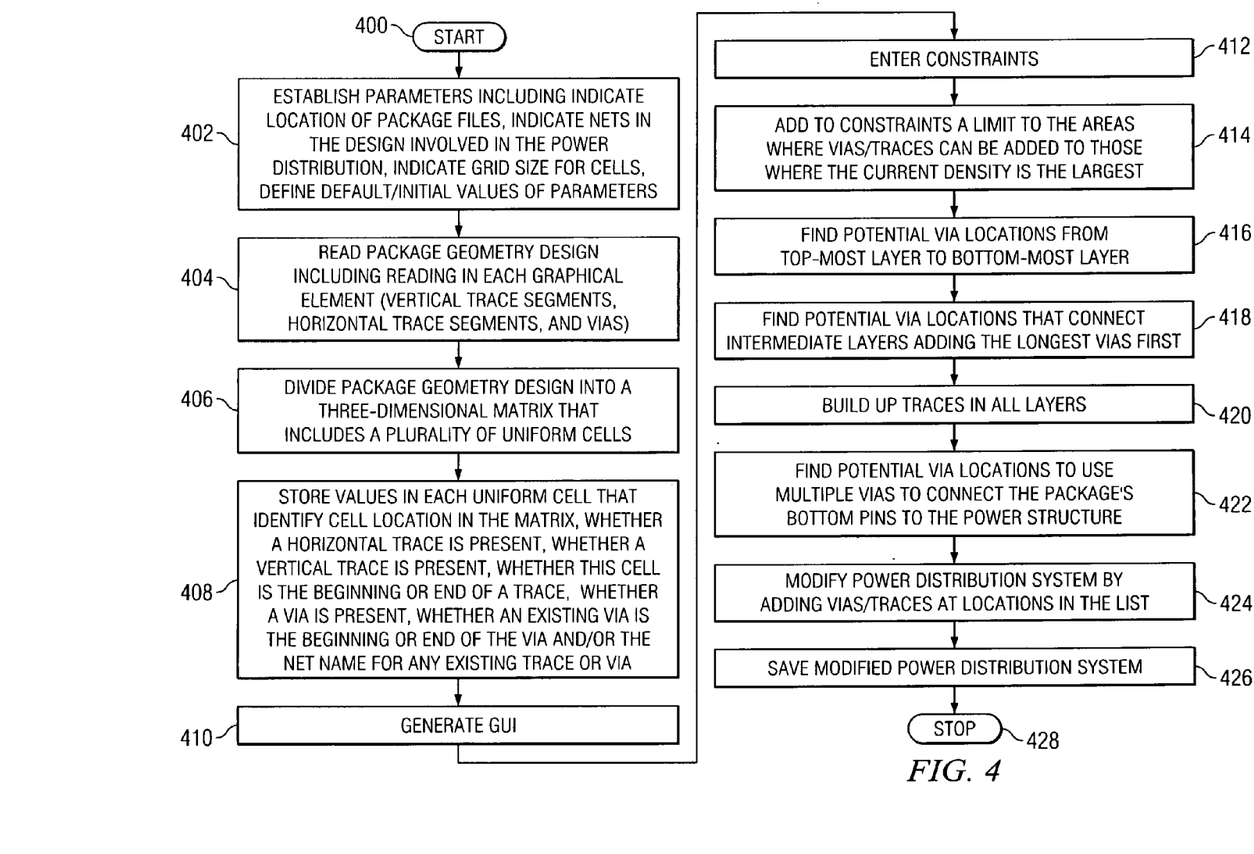
FIG. 4 illustrates a high level flow chart that depicts automatically enhancing a power distribution system (PDS) in a ceramic package design by locating possible additional via and/or trace locations in accordance with the present invention.

FIG. 4 illustrates a high level flow chart that depicts automatically enhancing a power distribution system (PDS) in a ceramic package design by locating possible additional via and/or trace locations in accordance with the present invention. The process starts as depicted by block 400 and thereafter passes to block 402 which illustrates establishing parameters including indicating the location of package files, indicating nets in the package design that are involved in the power distribution system such as supply voltage nets and ground nets, indicating a grid size for the cells, and defining default/initial values of parameters.

The process then passes to block 404 which depicts reading in the package geometry design including reading in each graphical element. Graphical elements include vertical trace segments, horizontal trace segments, and vias. The package design is generated using any method according to the prior art. The package design already includes the layout and routing of data signals.

Next, according to the present invention, block 406 illustrates dividing the package geometry design into a three-dimensional matrix that includes a plurality of uniformly shaped grid cells. Block 408, then, depicts storing values in each cell of the matrix. These values identify cell location in the matrix, whether a horizontal trace is present, whether a vertical trace is present, whether this cell is the beginning or end of a trace, whether the cell already contains a via, whether an existing via is the beginning or ending of a via, and a net name of a power net if a trace or via is present where the trace or via is part of that power net. Each cell is identified by indexes i, j, and k which corresponds to a unique set of x, y, and z physical coordinates. The i index indicates a relative horizontal location of the cell in a layer. The j index indicates a relative vertical location of the cell in a layer. The k index indicates a particular layer within the package.

Thereafter, block 410 illustrates generating a graphical user interface (GUI).

Next, block 412 depicts entering constraints. The constraints specify power distribution system design parameters as well as modification parameters. For example, the constraints will specify how many elements, such as traces and/or vias to be added. The constraints will specify a maximum and/or minimum length for each via. The constraints may specify preferred locations for particular types of vias, whether or not particular signal traces must be shielded by a power net, and other types of design parameters. For example, the following may be a partial list of constraints: restrict vias to the areas where they are needed by locating where a package's voltage drop is greater than a predetermined value, add vias that tie the top layers to the bottom layers and thereafter add vias that tie intermediate layers together (i.e. add vias beginning with the longest ones possible), add mesh traces to package and complete the existing power distribution system, and make as many via connections to package's I/O pins from the power distribution system as possible.

The process then passes to block 414 which illustrates adding to the constraints a limit to the areas where vias/traces can be added to those locations where the current density is the largest. These areas can be determined using circuit simulation tools. These areas can be estimated by considering the outline of the active components within the chip to which this package will be connected.

Thereafter, block 416 depicts finding potential via locations from the top-most layer of the package to the bottom-most layer of the package. This step will add as many vias as needed that connect the top-most layer to the bottom-most layer. Next, block 418 illustrates finding potential locations that connect the intermediate layers. The longest via locations are added first. Block 420, then, depicts building up the traces in all layers. Thereafter, block 422 illustrates finding potential via locations where multiple vias can be used to connect the package's bottom pins to the power structure.

Figure 5:
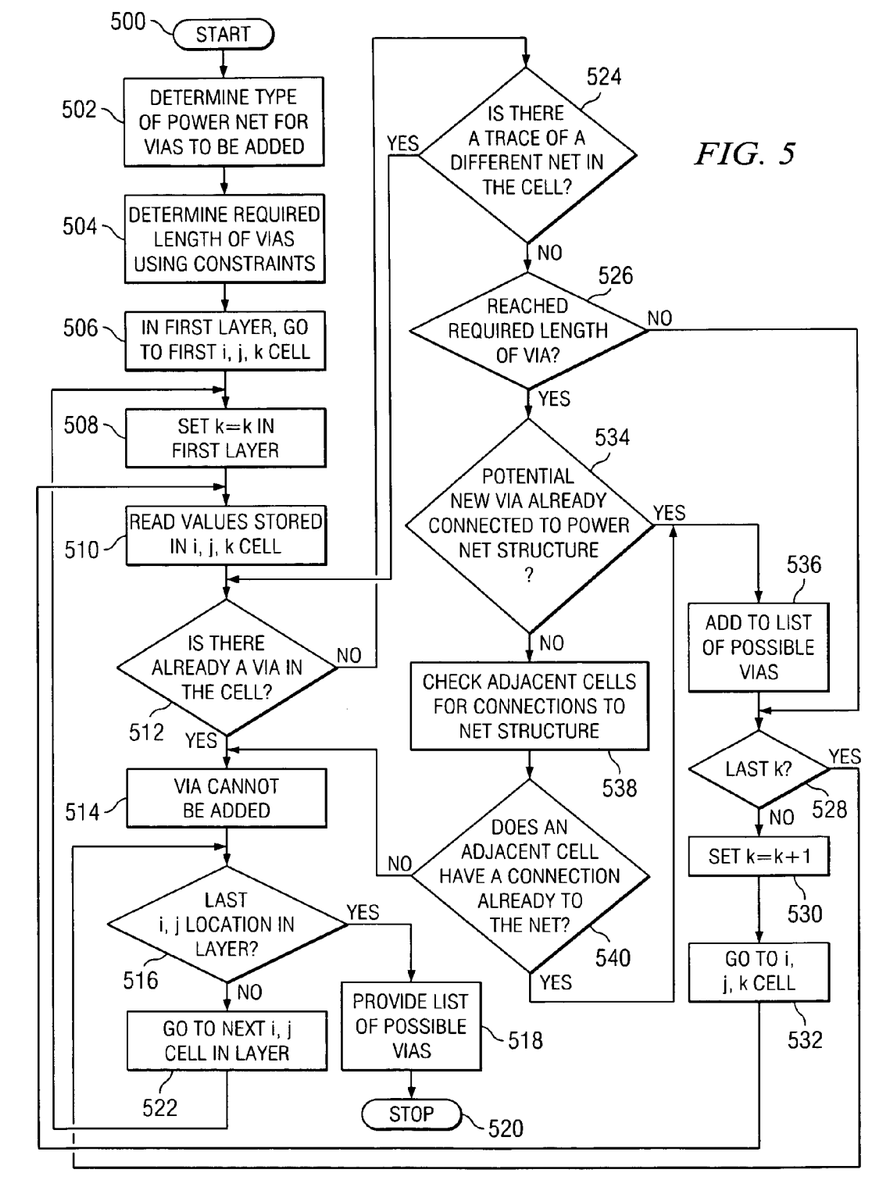
FIG. 5 depicts a high level flow chart that illustrates automatically generating a list of possible via locations in a ceramic package design in accordance with the present invention.
Figure 6:
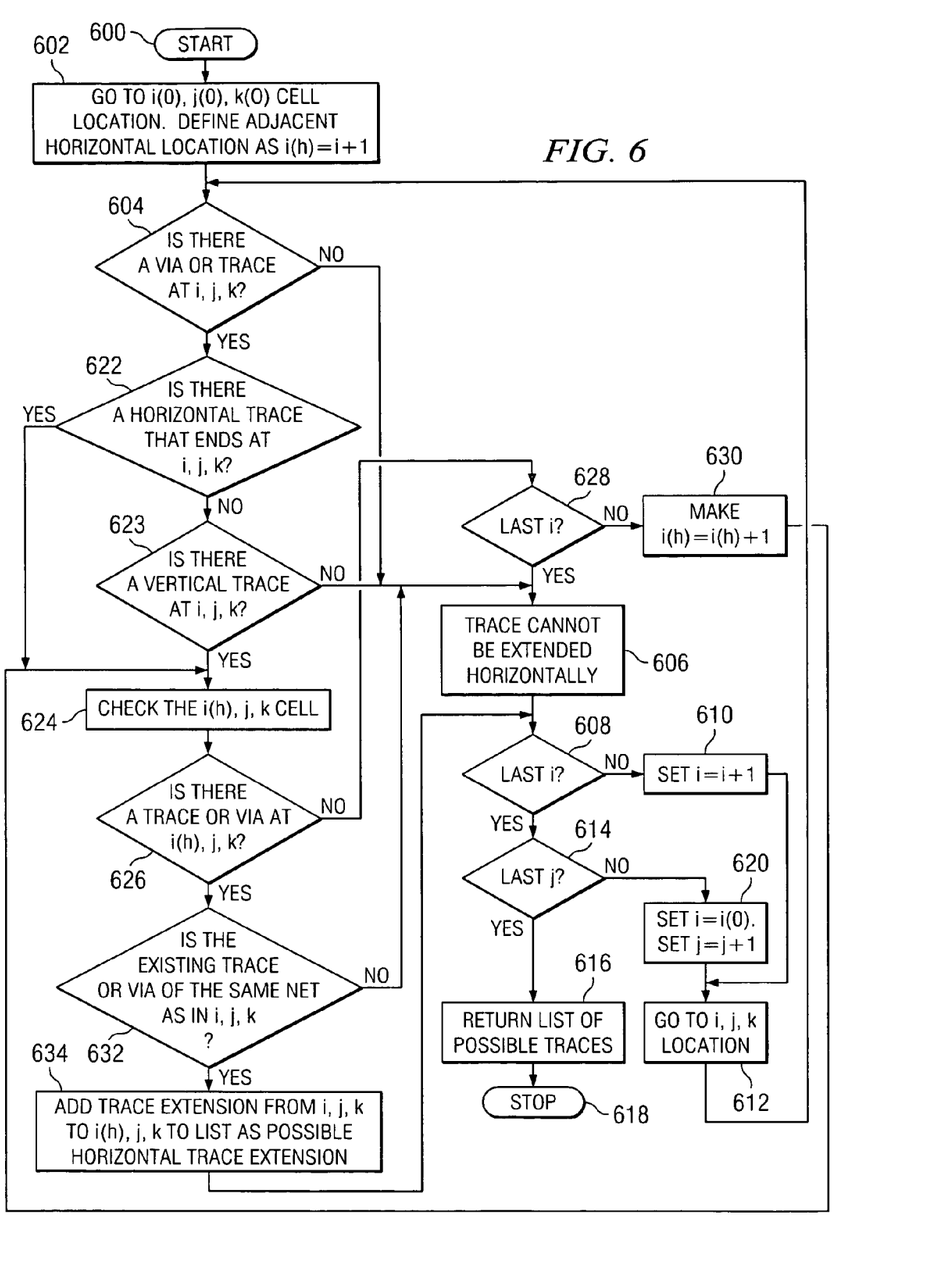
FIG. 6 illustrates a high level flow chart that depicts automatically determining whether existing traces can be extended horizontally in a layer in a ceramic package design in accordance with the present invention.
Figure 7:
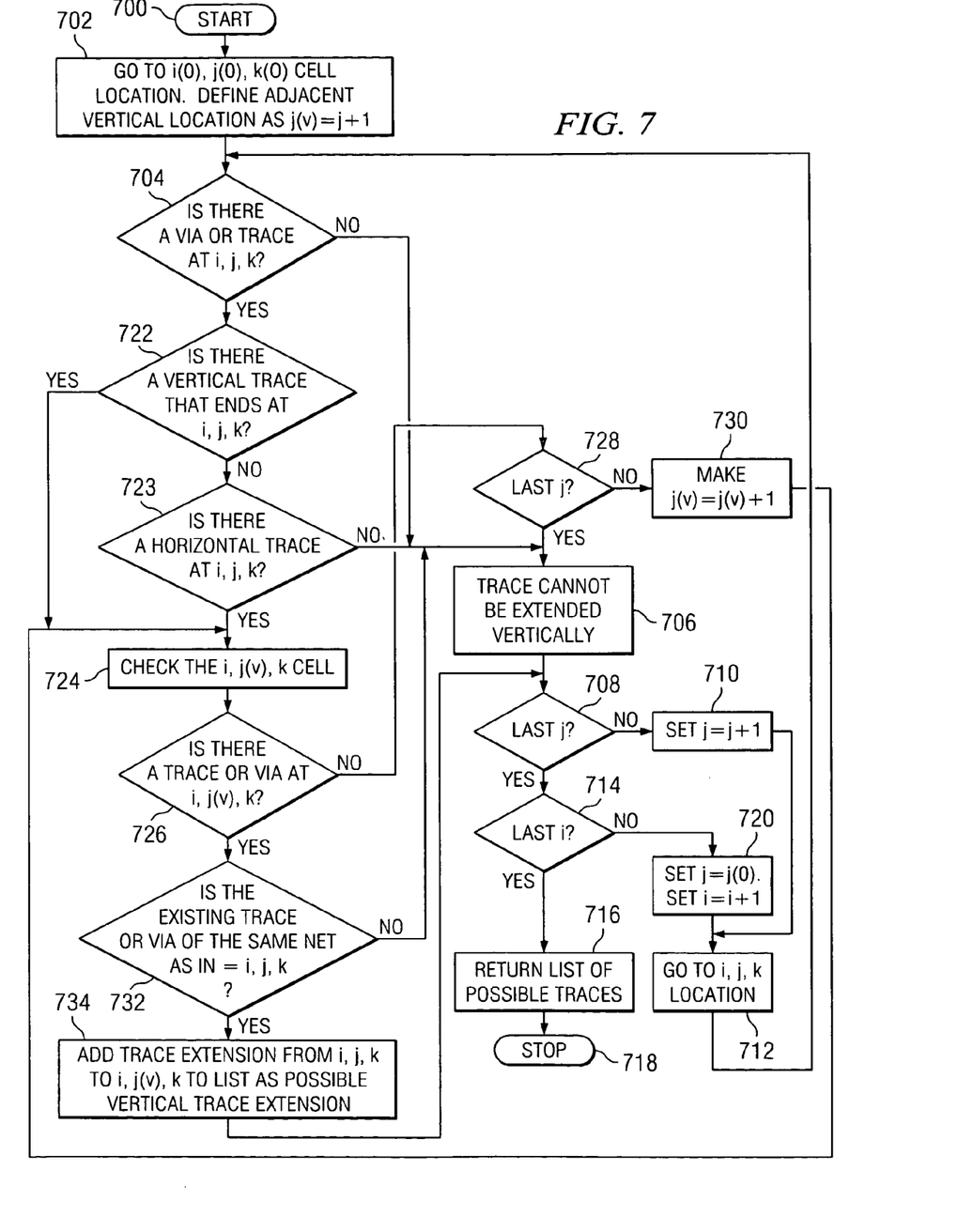
FIG. 7 depicts a high level flow chart that illustrates automatically determining whether existing traces can be extended vertically in a layer in a ceramic package design in accordance with the present invention.

FIG. 5 depicts the process of generating possible via locations. FIGS. 6 and 7 illustrate the process of finding potential trace locations where an existing trace can be extended.

Thereafter, block 424 depicts modifying the power distribution system by adding vias and/or traces at locations that are included in the list. Block 426, then, illustrates saving the modified power distribution system. The process then terminates as depicted by block 428.

FIG. 5 depicts a high level flow chart that illustrates automatically generating a list of possible via locations in a ceramic package design in accordance with the present invention. This process is executed for a particular power net, a beginning layer, an ending layer, and a set of i and j locations. Given this information, the process described by FIG. 5 will find all geometry openings where vias can be added in such a way that the new via makes an electrical connection to the particular power net at both layers.

The process starts as depicted by block 500 and thereafter passes to block 502 which illustrates determining the type of power net for the vias to be added. Next, block 504 depicts determining the required length of vias using the constraints. Thereafter, block 506 illustrates going to the first i, j, k cell in the first layer. The process then passes to block 508 which depicts setting k equal to the value of k in the first layer. Block 510 illustrates reading the information that is stored in this i, j, k cell.

Thereafter, block 512 depicts a determination of whether or not there is already a via in this cell. This determination is made using the information that is stored in the cell. If a determination is made that there is already a via in the cell, the process passes to block 514 which illustrates the inability to add a via in this cell. A via cannot be added in this cell. The process then passes to block 516 which depicts a determination of whether or not this is the last i, j cell location in this layer. If a determination is made that this is the last i, j cell location, the process passes to block 518 which depicts providing the list of possible vias. The process then terminates as illustrated by block 520.

Referring again to block 516, if a determination is made that this is not the last i, j cell location in this layer, the process passes to block 522 which depicts going to the next i, j cell location in this layer. The process then passes back to block 508.

Referring again to block 512, if a determination is made that there is not already a via in this cell, the process passes to block 524 which illustrates a determination of whether or not there is already a trace of a different net in this cell. If there is a determination that there is already a trace of a different net in this cell, the process passes to block 514.

Referring again to block 524, if there is a determination that there is not already a trace of a different net in the cell, the process passes to block 526. Block 526, then, illustrates a determination of whether or not this potential new via is as long as the required length, which is specified by the constraints, for a via. If a determination is made that the required length has not been reached for a via, the process passes to block 528 which depicts a determination of whether or not this is the last k. This determination is really a determination whether or not this is the last layer in the package. If a determination is made that this is the last k, the process passes to block 516. Referring again to block 528, if a determination is made that this is not the last k, the process passes to block 530 which illustrates setting the current value of k equal to the current value of k plus 1. This has the effect of making the k value equal to the next layer in the package. The process then passes to block 532 which depicts going to the i, j, k cell location. The process then passes to block 510.

Referring again to block 526, if a determination is made that the required length for a via has been reached, the process passes to block 534 which depicts a determination of whether this potential new via is already connected to the same power net structure that was determined in block 502. If a determination is made that this potential new via is already connected to the power net structure, the process passes to block 536 which illustrates adding this potential new via to the list of potential new vias locations. The process then passes to block 528.

Referring again to block 534, if a determination is made that this potential new via is not already connected to the power net structure, the process passes to block 538 which depicts checking adjacent cells for connections to the net structure. Next, block 540 depicts a determination of whether or not an adjacent cell already has a connection to the power net that was determined in block 502. If a determination is made that an adjacent cell already has a connection to the same power net, the process passes to block 536. Referring again to block 540, if a determination is made that an adjacent cell does not already has a connection to the same power net, the process passes to block 514.

FIG. 6 illustrates a high level flow chart that depicts automatically determining whether existing traces can be extended horizontally in a layer in a ceramic package design in accordance with the present invention. This process is executed for a particular power net within a particular layer. The process of FIG. 6 determines whether a trace can be added or an existing trace can be extended such that the new or extended trace makes electrical contact between an i,j location and some other i,j location in the layer.

The process starts as depicted by block 600 and thereafter passes to block 602 which depicts going to a i(0), j(0), k(0) cell location. The adjacent horizontal cell location is defined as being i(h) which is equal to the current value of i plus one. Next, block 604 illustrates a determination of whether or not there is already a trace at this i, j, k location. If a determination is made that there is not already a trace at the i, j, k location, the process passes to block 606 which depicts determining that a trace cannot be extended horizontally from this i, j, k cell location.

The process then passes to block 608 which illustrates a determination of whether or not this is the last i cell location in this layer. If a determination is made that this is not the last i cell location, the process passes to block 610 which depicts setting i equal to i plus one. Thereafter, block 612 illustrates going to the i, j, k cell location. The process then passes back to block 604.

Referring again to block 608, if a determination is made that this is the last i cell location, the process passes to block 614 which depicts a determination of whether or not this is the last j location. If a determination is made that this is the last j location, the process passes to block 616 which illustrates returning the list of possible traces. The process then terminates as depicted by block 618.

Referring again to block 614, if a determination is made that this not the last j cell location, the process passes to block 620 which depicts setting i equal to i(0) and setting j equal to j plus one. The process then passes to block 612.

Referring again to block 604, if a determination is made that there is a trace or via at the i, j, k cell location, the process passes to block 622 which illustrates a determination of whether or not there is a horizontal trace that ends at the i, j, k cell location. If a determination is made that there is a horizontal trace that ends at the i, j, k cell location, the process passes to block 624. Referring again to block 622, if a determination is made that there is no horizontal trace that ends at the i, j, k cell location, the process passes to block 623 which depicts a determination of whether or not there is a vertical trace at the i, j, k cell location. If a determination is made that there is no vertical trace at the i, j, k cell location, the process passes to block 606. Referring again to block 623, if a determination is made that there is a vertical trace i, j, k cell location, the process passes to block 624.

Block 624 illustrates checking the i(h), j, k cell location by reading the information stored in this cell location. Next, block 626 depicts a determination of whether or not there is a trace or via at the i(h), j, k cell location. If a determination is made that there is no trace or via at the i(h), j, k cell location, the process passes to block 628 which illustrates a determination of whether or not this is the last i cell in this layer. If a determination is made that this is the last i cell, the process passes to block 606. Referring again to block 628, if a determination is made that this is not the last i cell, the process passes to block 630 which depicts making i(h) equal to i(h) plus one. The process then passes back to block 624.

Referring again to block 626, if a determination is made that there is already a trace or via at the i(h), j, k cell location, the process passes to block 632 which depicts a determination of whether or not the existing trace or via at the i(h), j, k cell location is the same power net as the trace at the i, j, k cell location. If a determination is made that the existing trace or via at the i(h), j, k cell location is not of the same net as the trace at the i, j, k cell location, the process passes to block 606. Referring again to block 632, if a determination is made that the existing trace or via at the i(h), j, k cell location is of the same net as the trace at the i, j, k cell location, the process passes to block 634 which illustrates adding a trace extension from the i, j, k cell location to the i(h), j, k cell location to the list as a possible horizontal trace extension. The process then passes back to block 608.

FIG. 7 depicts a high level flow chart that illustrates automatically determining whether existing traces can be extended vertically in a layer in a ceramic package design in accordance with the present invention. The process starts as depicted by block 700 and thereafter passes to block 702 which depicts going to a i(0), j(0), k(0) cell location. The adjacent vertical cell location is defined as being j(v) which is equal to the current value of j plus one. Next, block 704 illustrates a determination of whether or not there is already a trace at this i, j, k location. If a determination is made that there is not already a trace at the i, j, k location, the process passes to block 706 which depicts determining that a trace cannot be extended vertically from this i, j, k cell location.

The process then passes to block 708 which illustrates a determination of whether or not this is the last j cell location. If a determination is made that this is not the last j cell location, the process passes to block 710 which depicts setting j equal to j plus one. Thereafter, block 712 illustrates going to the i, j, k cell location. The process then passes back to block 704.

Referring again to block 708, if a determination is made that this is the last j cell location, the process passes to block 714 which depicts a determination of whether or not this is the last i cell location in this layer. If a determination is made that this is the last i cell location, the process passes to block 716 which illustrates returning the list of possible traces. The process then terminates as depicted by block 718.

Referring again to block 714, if a determination is made that this not the last i cell location, the process passes to block 720 which depicts setting j equal to j(0) and setting i equal to i plus one. The process then passes to block 712.

Referring again to block 704, if a determination is made that there is a trace or via at the i, j, k cell location, the process passes to block 722 which illustrates a determination of whether or not there is a vertical trace that ends at the i, j, k cell location. If a determination is made that there is a vertical trace that ends at the i, j, k cell location, the process passes to block 724. Referring again to block 722, if a determination is made that there is no vertical trace that ends at the i, j, k cell location, the process passes to block 723 which depicts a determination of whether or not there is a horizontal trace at the i, j, k cell location. If a determination is made that there is no horizontal trace at the i, j, k cell location, the process passes to block 706. Referring again to block 723, if a determination is made that there is a horizontal trace i, j, k cell location, the process passes to block 724.

Block 724 illustrates checking the i, j(v), k cell location by reading the information stored in this cell location. Next, block 726 depicts a determination of whether or not there is a trace or via at the i, j(v), k cell location. If a determination is made that there is no trace or via at the i, j(v), k cell location, the process passes to block 728 which illustrates a determination of whether or not this is the last j cell location. If a determination is made that this is the last j cell location, the process passes to block 706. Referring again to block 728, if a determination is made that this is not the last j cell location, the process passes to block 730 which depicts making j(v) equal to j(v) plus one. The process then passes back to block 724.

Referring again to block 726, if a determination is made that there is already a trace or via at the i, j(v), k cell location, the process passes to block 732 which depicts a determination of whether or not the existing trace or via at the i, j(v), k cell location is of the same net as the trace at the i, j, k cell location. If a determination is made that the existing trace or via at the i, j(v), k cell location is not of the same net as the trace at the i, j, k cell location, the process passes to block 706. Referring again to block 732, if a determination is made that the existing trace or via at the i, j(v), k cell location is of the same net as the trace at the i, j, k cell location, the process passes to block 734 which illustrates adding a trace extension from the i, j, k cell location to the i, j(v), k cell location to the list as a possible vertical trace extension. The process then passes back to block 708.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically creating and extending a power distribution system (PDS) in a three-dimensional ceramic integrated circuit package design that includes a plurality of layers where the PDS includes mesh power planes, said method comprising:

dividing said entire design into a plurality of cells;

storing information in each one of said plurality of cells;

for each one of said plurality of cells, said information describing characteristics of a location of said each one of said plurality of cells relative to others of said plurality of cells and describes any via or trace that already passes through said each one of said plurality of cells;

automatically locating potential new via and trace locations, utilizing said information, throughout all of said entire package design at a particular time;

prior to finding any other potential location for adding vias or traces, finding potential locations where a via can be added to said design that would connect a top layer of said package design to a bottom layer of said package design;

after finding potential locations where a via can be added that would connect a top layer of said package design to a bottom layer of said package design, finding potential locations where vias can be added to said design that would connect intermediate layers; and said step of finding potential locations where vias can be added to said design that would connect intermediate layers being executed to find longest via locations first.

2. The method according to claim 1, further comprising:

specifying constraints to use when finding potential via and trace locations, said constraints including manufacturing constraints, engineering constraints, and power distribution system constraints.

3. The method according to claim 2, further comprising:

specifying a constraint that limits areas in said package design where potential locations are found to areas where current density exceeds a particular amount.

4. The method according to claim 1, further comprising:

after finding potential locations where vias can be added to said design that would connect intermediate layers, finding locations where existing traces can be extended.

5. The method according to claim 4, further comprising:

after finding locations where existing traces can be extended, finding potential locations for vias where multiple different vias would connect pins in a bottom of said package design to a power structure that supplies power signals and ground to said package design.

6. The method according to claim 1, further comprising:

said information including whether said each one of said plurality of cells includes a beginning of a via, an end of a via, a beginning of a trace, an end of a trace, a trace segment, a via segment, and an identification of a power net when said each one of said plurality of cells includes either an existing trace or via wherein said existing trace or via is part of said identified power net.

7. A method in a data processing system for automatically creating and extending a power distribution system (PDS) in a three-dimensional ceramic integrated circuit package design that includes a plurality of layers where the PDS includes mesh power planes, said method comprising:

dividing said entire design into a plurality of cells;

storing information in each one of said plurality of cells;

for each one of said plurality of cells, said information describing characteristics of a location of said each one of said plurality of cells relative to others of said plurality of cells and describes any via or trace that already passes through said each one of said plurality of cells;

automatically locating potential new via and trace locations, utilizing said information, throughout all of said entire package design at a particular time;

determining a particular power net to be enhanced by finding potential via locations, said power net being either a ground power net or a supply voltage power net;

for a first one of said plurality of said cells, determining whether said first one already includes a via or a trace;

in response to determining that said first one does not already include an existing via or trace, determining whether a new via can be added that will extend to a required specified depth, said new via beginning in said first one and ending in a second one of said plurality of cells, said length from said first one to said second one meeting or exceeding said required specified depth; and in response to determining that said new via can be added that will extend to said required specified depth, adding to a list of potential via locations a location for said new via from said first one to said second one.

8. The method according to claim 7, further comprising:
in response to determining that said first one already includes an existing via or trace, determining whether said existing via or trace is part of said particular power net;
in response to determining that said existing via or trace is not part of said particular power net, going to a next cell location without adding said first one to a list of potential via locations; and
in response to determining that said existing via or trace is part of said particular power net, determining whether a new via can be added that will extend to a required specified depth, said new via beginning in said first one and ending in a second one of said plurality of cells, said length from said first one to said second one meeting or exceeding said required specified depth; and
in response to determining that said new via can be added that will extend to said required specified depth, adding to a list of potential via locations a location for said new via from said first one to said second one.

9. The method according to claim 7, further comprising:
locating a trace within a first layer;
identifying which power net said trace is a part of;
determining whether said trace can be extended in a horizontal direction by determining whether a second trace exists in said horizontal direction that is also a part of said identified power net;
adding said trace extension in said horizontal direction to said second trace as a potential trace extension location;
determining whether said trace can be extended in a vertical direction by determining whether a third trace exists in said vertical direction that is also a part of said identified power net; and
adding said trace extension in said vertical direction to said third trace as a potential trace extension location.

10. An apparatus in a data processing system for automatically creating and extending a power distribution system (PDS) in a three-dimensional ceramic integrated circuit package design that includes a plurality of layers where the PDS includes mesh power planes, said apparatus comprising:
said entire design being divided into a plurality of cells;
information stored in each one of said plurality of cells;
for each one of said plurality of cells, said information describing characteristics of a location of said each one of said plurality of cells relative to others of said plurality of cells and describes any via or trace that already passes through said each one of said plurality of cells;
potential new via and trace locations located, utilizing said information, throughout all of said entire package design at a particular time;
a particular power net to be enhanced by finding potential via locations, said power net being either a ground power net or a supply voltage power net;
a first one of said plurality of said cells;
said data processing system including a CPU executing code for determining whether said first one already includes a via or a trace;
in response to determining that said first one does not already include an existing via or trace, said CPU executing code for determining whether a new via can be added that will extend to a required specified depth, said new via beginning in said first one and ending in a second one of said plurality of cells, said length from said first one to said second one meeting or exceeding said required specified depth; and in response to determining that said new via can be added that will extend to said required specified depth, a location for said new via from said first one to said second one included in a list of potential via locations.

11. The apparatus according to claim 10, further comprising:
constraints that are specified to use when finding potential via and trace locations, said constraints including manufacturing constraints, engineering constraints, and power distribution system constraints.

12. The apparatus according to claim 10, further comprising:
first potential locations located where a via can be added to said design that would connect a top layer of said package design to a bottom layer of said package design, said first potential locations being located prior to finding any other potential locations.

13. The apparatus according to claim 12, further comprising:
second potential locations located where vias can be added to said design that would connect intermediate layers, said second potential locations being found after said first potential locations are found.

14. The apparatus according to claim 13, further comprising:
third potential locations located where existing traces can be extended, said third potential locations being found after said second potential locations are found.

15. The apparatus according to claim 14, further comprising:
said information including an indication of whether said each one of said plurality of cells includes a beginning of a via, an end of a via, a beginning of a trace, an end of a trace, a trace segment, a via segment, and an identification of a power net when said each one of said plurality of cells includes either a trace or via wherein said existing trace or via is part of said identified power net.

16. The apparatus according to claim 10, further comprising:
in response to determining that said first one already includes an existing via or trace, said CPU executing code for determining whether said existing via or trace is part of said particular power net;
in response to determining that said existing via or trace is not part of said particular power net, said CPU executing code for analyzing a next cell location without adding said first one to a list of potential via locations; and
in response to determining that said existing via or trace is part of said particular power net, said CPU executing code for determining whether a new via can be added that will extend to a required specified depth, said new via beginning in said first one and ending in a second one of said plurality of cells, said length from said first one to said second one meeting or exceeding said required specified depth; and
in response to determining that said new via can be added that will extend to said required specified depth, a location for said new via from said first one to said second one included in a list of potential via locations.

* * * * *